(12) United States Patent
Nguyen et al.

(10) Patent No.: US 10,782,488 B2
(45) Date of Patent: Sep. 22, 2020

(54) CONNECTOR-ATTACHED OPTICAL FIBER CORD WITH PROTECTIVE TUBE

(71) Applicant: FUJIKURA LTD., Tokyo (JP)

(72) Inventors: Thao Thi Thanh Nguyen, Chiba (JP); Kunihiko Fujiwara, Chiba (JP); Junya Watanabe, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/347,881

(22) PCT Filed: Jun. 15, 2017

(86) PCT No.: PCT/JP2017/022150
§ 371 (c)(1),
(2) Date: May 7, 2019

(87) PCT Pub. No.: WO2018/105152
PCT Pub. Date: Jun. 14, 2018

(65) Prior Publication Data
US 2019/0310430 A1   Oct. 10, 2019

(30) Foreign Application Priority Data

Dec. 5, 2016   (JP) ................. 2016-235841

(51) Int. Cl.
*G02B 6/36* (2006.01)
*G02B 6/38* (2006.01)

(52) U.S. Cl.
CPC ............. *G02B 6/3887* (2013.01); *G02B 6/36* (2013.01); *G02B 6/38* (2013.01); *G02B 6/3858* (2013.01)

(58) Field of Classification Search
CPC ........... G02B 6/36; G02B 6/38; G02B 6/3887
USPC ......................................................... 385/88
See application file for complete search history.

(56) References Cited

U.S. PATENT DOCUMENTS

| 6,913,394 | B2 * | 7/2005 | Iwano | G02B 6/3851 385/60 |
| 8,596,883 | B2 * | 12/2013 | Taira | G02B 6/3849 385/78 |
| 2011/0097044 | A1 * | 4/2011 | Saito | G02B 6/3887 385/83 |
| 2014/0241670 | A1 * | 8/2014 | Barnette, Jr. | G02B 6/3871 385/77 |

(Continued)

FOREIGN PATENT DOCUMENTS

| JP | 2001051131 A | 2/2001 |
| JP | 2002333545 A | 11/2002 |

(Continued)

*Primary Examiner* — Akm E Ullah
(74) *Attorney, Agent, or Firm* — Osha Liang LLP (57) ABSTRACT

A connector-attached optical fiber cord includes: an optical fiber cord including a coated optical fiber and a sheath surrounding a circumference of the coated optical fiber; a ferrule attached to a front end of the coated optical fiber; a housing that houses the ferrule and the optical fiber cord such that the ferrule is exposed to an exterior of the housing at a front end of the housing while the optical fiber cord extends out of a rear end of the housing; a protective tube attached to a portion of the optical fiber cord in which the coated optical fiber is exposed; and a boot attached to the rear end of the housing and that allows the portion of the optical fiber cord to be inserted through the boot.

4 Claims, 10 Drawing Sheets

(56) References Cited

U.S. PATENT DOCUMENTS

2015/0281951 A1* 10/2015 Geng .................. H04W 12/06
726/28

FOREIGN PATENT DOCUMENTS

| JP | 2009109978 A | 5/2009 |
| JP | 2011107590 A | 6/2011 |
| JP | 2015148735 A | 8/2015 |

* cited by examiner

CONNECTOR-ATTACHED OPTICAL FIBER CORD WITH PROTECTIVE TUBE

TECHNICAL FIELD

The present invention relates to a connector-attached optical fiber cord, and more particularly to a connector-attached optical fiber cord in which an optical connector is connected to an end of an optical fiber cord.

BACKGROUND

Heretofore, an optical connector has been assembled into an end of an optical fiber cord, for example, at a worksite or the like. For assembly of such an optical connector, an end of a short optical fiber that has been inserted into a ferrule provided on an optical connector is connected to an end of an optical fiber within an optical fiber cord by fusion splice. Thus, an optical connector is assembled at an end of the optical fiber cord (see, e.g., Patent Literature 1).

In order to reduce a bending stress applied to the optical fiber cord in the vicinity of the optical connector, a boot is attached to the connector-attached optical fiber cord thus constructed. Furthermore, a protective tube is also provided to suppress abrupt bending or winding of the optical fiber cord near an end of the boot and to suppress a bend loss caused to the optical fiber within the optical fiber cord.

Figure 1:
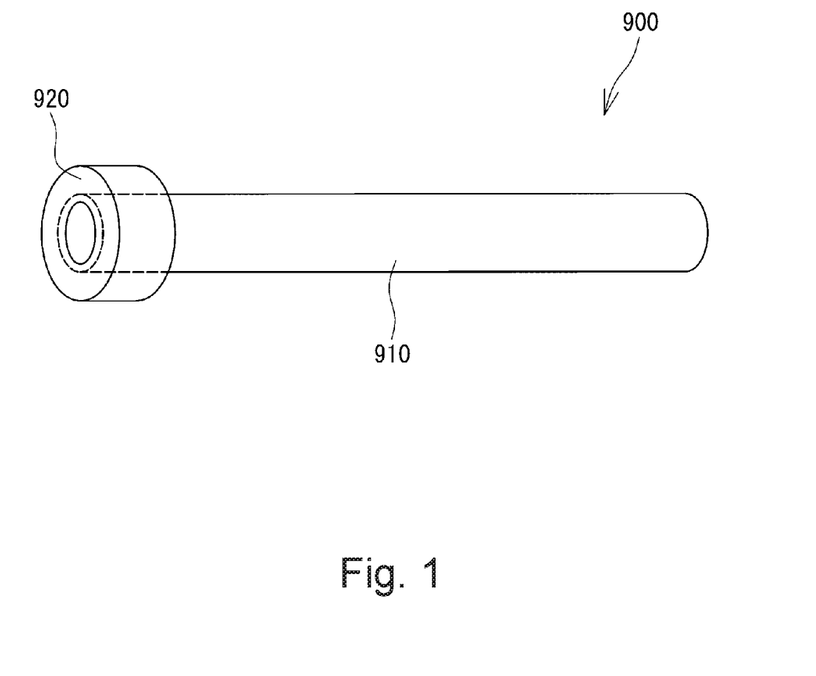
FIG. 1 is a perspective view showing a protective tube in a conventional boot unit for a connector.

FIG. 1 is a perspective view schematically showing such a conventional protective tube used for a connector-attached optical fiber cord. As shown in FIG. 1, the protective tube 900 is formed of, for example, a resin having flexibility. The protective tube 900 includes a tube body 910 extending in a longitudinal direction and a flange portion 920 formed so as to extend radially outward from one end of the tube body 910. The aforementioned optical fiber cord is inserted into an interior of the tube body 910. The flange portion 920 is engaged with an engagement portion (not shown) formed on the boot. The protective tube 900 is prevented from coming off from the boot by engagement of the flange portion 920 with the engagement portion of the boot.

In such a conventional protective tube 900, the flange portion 920 is provided as a separate member at an end of the tube body 910. Therefore, the conventional protective tube 900 requires a step of fixing the flange portion 920 in addition to a step of forming the tube body 910. Furthermore, since the conventional protective tube 900 requires the flange portion 920 in addition to the tube body 910, the cost for materials increases.

PATENT LITERATURE

Patent Literature 1: JP 2011-107590 A

SUMMARY

One or more embodiments of the present invention provide a connector-attached optical fiber cord that can be manufactured inexpensively with a reduced number of processes.

According to one or more embodiments of the present invention, there is provided a connector-attached optical fiber cord that can be manufactured inexpensively with a reduced number of processes. This connector-attached optical fiber cord has an optical fiber cord having a coated optical fiber and a sheath surrounding a circumference of the coated optical fiber, a ferrule attached to a front end of the coated optical fiber of the optical fiber cord, a housing that houses therein the ferrule and the optical fiber cord so that the ferrule is exposed to an exterior from a front end of the housing while the optical fiber cord extends from a rear end of the housing, a protective tube attached to a portion of the optical fiber cord in which the coated optical fiber is exposed, and a boot member attached to the rear end of the housing for allowing a portion of the optical fiber cord to which the protective tube is attached to be inserted through the boot member. The protective tube includes a tube body having a uniform outside diameter and a first end portion formed integrally with the tube body at an end of the tube body. The first end portion has an outside diameter greater than the outside diameter of the tube body. The boot member has an engagement portion that engages with the first end portion of the protective tube.

With this configuration, the first end portion of the protective tube that has been inserted through the boot member engages with the engagement portion of the boot member. Therefore, even if the protective tube is pulled hard in the longitudinal direction, movement of the protective tube in the longitudinal direction is regulated so as to prevent the protective tube from coming out of the boot member. Since the front end portion of the protective tube is formed integrally with the tube body, the front end portion does not need to be produced separately from the tube body. Accordingly, the man-hour and cost required for the manufacturing process of a boot unit for an optical connector is prevented from increasing.

The connector-attached optical fiber cord may further have a spring member including a larger-diameter portion located inside of the first end portion of the protective tube that has an outside diameter corresponding to an inside diameter of the first end portion and a smaller-diameter portion located inside of the tube body of the protective tube that has a diameter less than that of the larger-diameter portion. The protective tube thus configured can be produced by, for example, covering the spring member with a heat-shrinkable tube having an inside diameter greater than the outside diameter of the larger-diameter portion of the spring member and shrinking the heat-shrinkable tube by heat. Thus, a protective tube according to one or more embodiments of the present invention can readily be produced.

In one or more embodiments, the protective tube may further include a second end portion located opposite to the first end portion that has an inside diameter less than the inside diameter of the tube body. Since the inside diameter of the second end portion located opposite to the first end portion is smaller than the inside diameter of the tube body, the second end portion deforms depending upon the outside diameter of the optical fiber cord if the outside diameter of the optical fiber cord that has been inserted through the protective tube is not less than the inside diameter of the second end portion and is not more than the inside diameter of the tube body. Thus, the second end portion is brought into intimate contact with the optical fiber cord. Accordingly, no gap is formed between the end portion of the protective tube and the optical fiber cord even when an optical fiber cord having a different outside diameter is inserted through the protective tube. As a result, the optical fiber cord is prevented from rattling near the end portion of the protective tube. In other words, no individual protective tube suitable for an optical fiber cord having a different outside diameter is needed in order to prevent the optical fiber cord from rattling near an end portion of the protective tube.

Furthermore, the connector-attached optical fiber cord may further have a sleeve member to which a rear end portion of the housing is attached. The sleeve member has a flange portion that abuts against a front end face of the boot member. Since the flange portion of the sleeve member abuts against a front end face of the boot member, the sleeve member 41 can be positioned with respect to the boot member. Furthermore, as described above, the first end portion of the protective tube engages with the engagement portion of the boot member so as to regulate the movement of the protective tube in the longitudinal direction. Thus, a constant distance is maintained between an end face of the sleeve member and an end face of the protective tube within the boot member. Accordingly, for example, tensile members housed in the optical fiber cord and the like are prevented from being clogged (stacked) within the boot member.

According to one or more embodiments of the present invention, the first end portion of the protective tube that has been inserted through the boot member engages with the engagement portion of the boot member. Therefore, even if the protective tube is pulled hard in a longitudinal direction, movement of the protective tube in the longitudinal direction is regulated so as to prevent the protective tube from coming out of the boot member. Since the front end portion of the protective tube is formed integrally with the tube body, the front end portion does not need to be produced separately from the tube body. Accordingly, the man-hour and cost required for the manufacturing process of a boot unit for an optical connector is prevented from increasing.

DETAILED DESCRIPTION

One or more embodiments of a connector-attached fiber code according to the present invention will be described in detail below with reference to FIGS. 2 to 10. In FIGS. 2 to 10, the same or corresponding components are denoted by the same or corresponding reference numerals and will not be described below repetitively. Furthermore, in FIGS. 2 to 10, the scales or dimensions of components may be exaggerated, or some components may be omitted.

Figure 2:
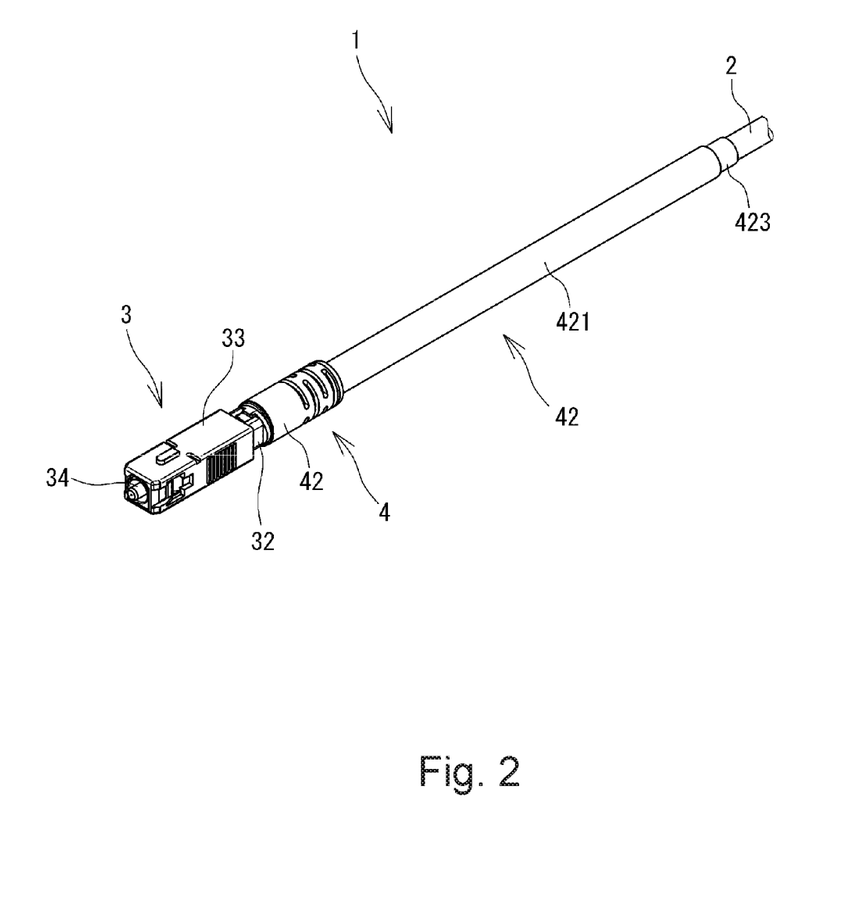
FIG. 2 is a perspective view showing a connector-attached optical fiber cord according to one or more embodiments of the present invention.
Figure 3:
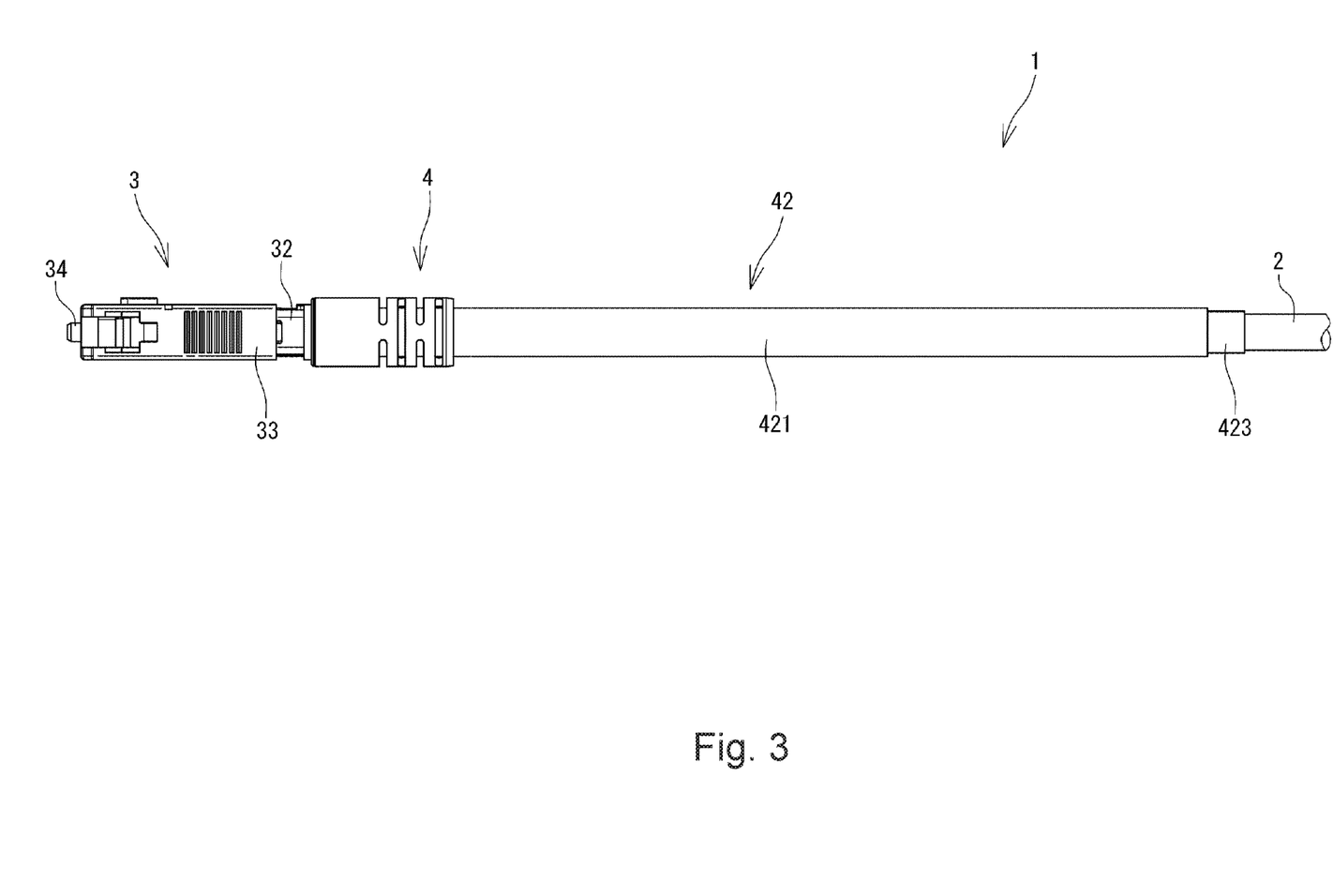
FIG. 3 is a front view of the connector-attached optical fiber cord of FIG. 2.
Figure 4:
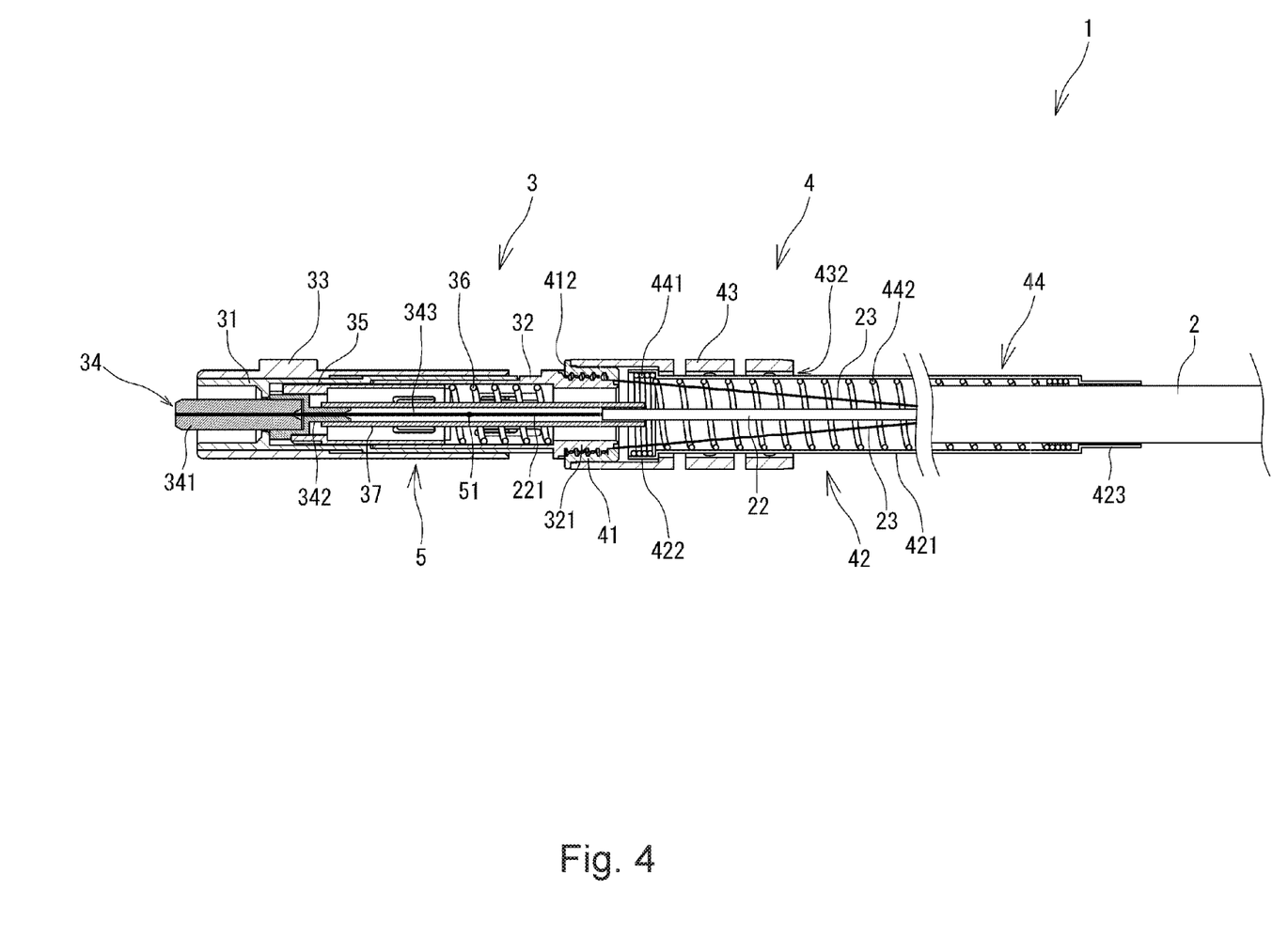
FIG. 4 is a vertical cross-sectional view of the connector-attached optical fiber cord of FIG. 2.

FIG. 2 is a perspective view showing a connector-attached optical fiber cord 1 according to one or more embodiments of the present invention, FIG. 3 is a front view of FIG. 2, and FIG. 4 is a vertical cross-sectional view of the connector-attached optical fiber cord 1. As shown in FIGS. 2 to 4, the connector-attached optical fiber cord 1 includes an optical fiber cord 2, an optical connector 3 assembled at a front end of the optical fiber cord 2, and a boot unit 4 for an optical connector that is attached to the optical connector 3 according to one or more embodiments. In the following description, the left side of FIG. 3 is referred to as a "front side" or "front" whereas the right side of FIG. 3 is referred to as a "rear side" or "rear."

As shown in FIG. 4, the optical connector 3 according to one or more embodiments includes a plug frame 31, a stop ring 32 attached to the plug frame 31, and a coupling sleeve 33 disposed outside the plug frame 31 and arranged so as to be slidable within a predetermined range along an axial direction. The plug frame 31 and the stop ring 32 jointly form a housing 5, which houses therein a ferrule 34 and a front end portion of the optical fiber cord 2. The housing 5 has an interior space that accommodates the ferrule 34, a slider 35 that can engage with a rear end face of the ferrule 34 and can slide along the axial direction, a coil spring 36 configured to bias the slider 35 and the ferrule 34 in a forward direction, a heat seal sleeve 37 formed of a resin that extends along the axial direction, and the front end portion of the optical fiber cord 2. As shown in FIG. 4, the ferrule 34 is exposed from a front end of the housing 5, and the optical fiber cord 2 extends from a rear end of the housing 5.

The ferrule 34 includes a cylindrical capillary portion 341, a flange portion 342 fixed at a rear end of the capillary portion 341, and a short optical fiber 343 inserted into a fiber hole extending through the capillary portion 341. For example, ceramics such as zirconia or glass may be used as a material for the capillary portion 341. Furthermore, the capillary portion 341 may employ the same arrangement as used for a ferrule in an SC-type optical connector (F04 type optical connector as defined in JIS C 5973) or an MU-type optical connector (F14 type optical connector as defined in JIS C 5973).

Figure 5:
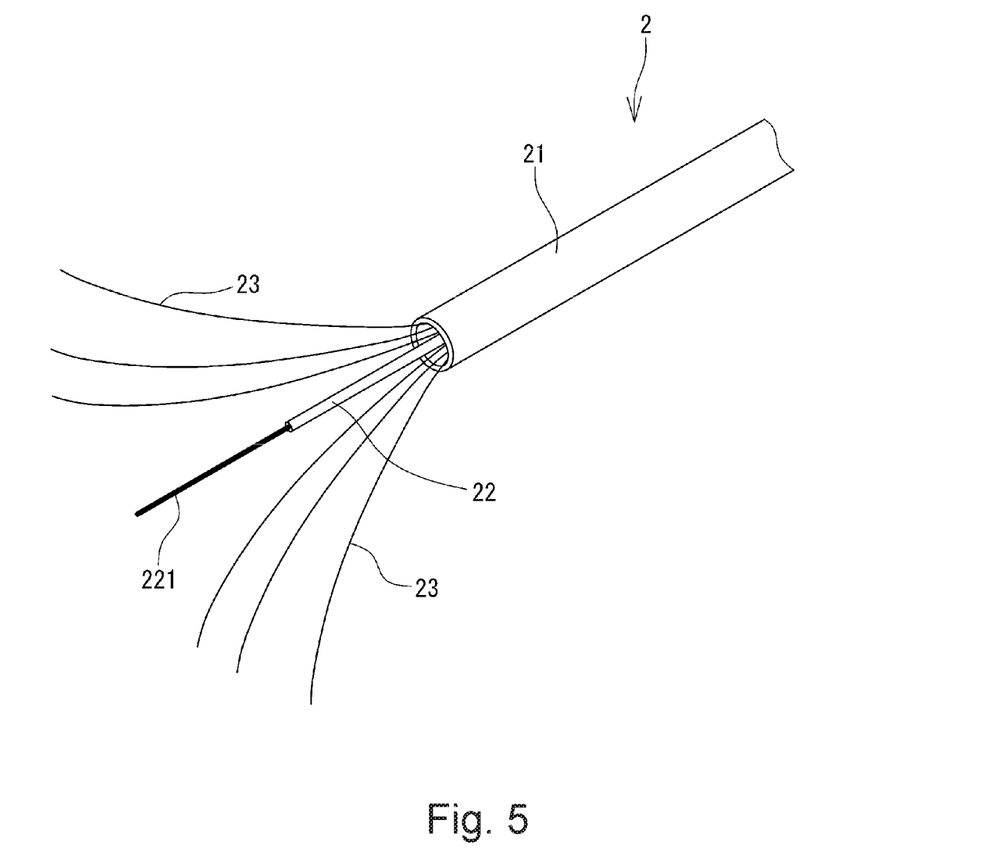
FIG. 5 is a perspective view schematically showing an optical fiber cord in the connector-attached optical fiber cord of FIG. 2.

FIG. 5 is a perspective view schematically showing the optical fiber cord 2 according to one or more embodiments. As shown in FIG. 5, the optical fiber cord 2 includes a tubular sheath 21 formed of resin such as polyethylene, a coated optical fiber 22 received within the sheath 21, which surrounds the circumference of the coated optical fiber 22, and tensile members 23 extending along a longitudinal direction of the coated optical fiber 22. The coated optical fiber 22 of the optical fiber cord 2 of one or more embodiments is formed by one single-core optical fiber. However, for the coated optical fiber 22, one or more secondary coated optical fibers or primary coated optical fibers may be used. The tensile members 23 are formed of aramid fiber, glass fiber, carbon fiber, or the like.

The connector-attached optical fiber cord 1 of one or more embodiments can be assembled, for example, at a worksite or the like. Specifically, a portion of the sheath 21 is removed from a front end of the optical fiber cord 2 to expose the coated optical fiber 22. Furthermore, a portion of the coating located at a front end of the coated optical fiber 22 is removed to expose a primary coated optical fiber 221. A front end of the bare optical fiber 221 is connected to the aforementioned short optical fiber 343 of the ferrule 34 of the optical connector 3 by fusion splice. Thus, the connector-attached optical fiber cord 1 is assembled. A fusion splice portion 51 (see FIG. 4) where the short optical fiber 343 of the ferrule 34 and the bare optical fiber 221 of the optical fiber cord 2 are connected by fusion splice is located inside of the heat seal sleeve 37. For example, the interior of the heat seal sleeve 37 is filled with a thermoplastic resin to reinforce the fusion splice portion 51.

Figure 6:
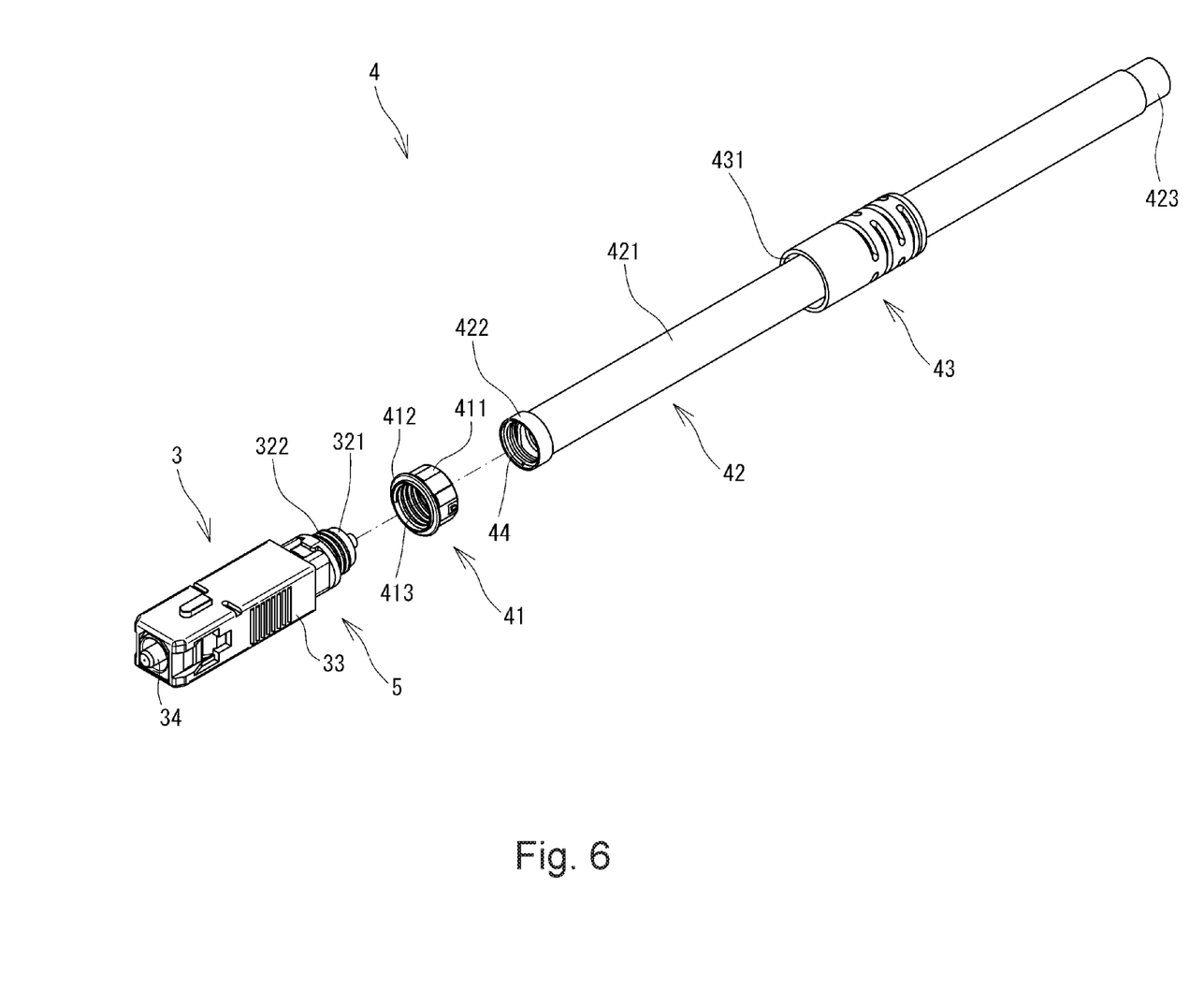
FIG. 6 is an exploded perspective view showing a boot unit for an optical connector in the connector-attached optical fiber cord of FIG. 2.

FIG. 6 is an exploded perspective view showing the boot unit 4 for an optical connector along with the optical connector 3 according to one or more embodiments. As shown in FIG. 6, the stop ring 32 of the optical connector 3 has a cylindrical stationary portion 321 extending in a rearward direction. A screw thread 322 is formed on an outer circumferential surface of the stationary portion 321. The boot unit 4 for an optical connector includes a cylindrical sleeve member (sleeve) 41 attached to the stationary portion 321 of the stop ring 32, a protective tube 42 for protecting an outside of the coated optical fiber 22 which is attached to a portion of the optical fiber cord 2 where the coated optical fiber 22 is exposed, a boot member (boot) 43 attached to a rear end of the housing 5 when the optical connector 3 is assembled, and a coil spring (spring member or spring) 44 disposed inside of the protective tube 42.

The sleeve member 41 includes a cylindrical portion 411 and a flange portion (flange) 412 extending radially at a front end of the cylindrical portion 411. A thread groove 413 is formed in an inner circumferential surface of this sleeve member 41. The screw thread 322 (see FIG. 6) formed in the outer circumferential surface of the stationary portion 321 of the stop ring 32 is threaded into the thread groove 413 of the sleeve member 41. Thus, the screw thread 322 of the stationary portion 321 of the stop ring 32 is threaded into the thread groove 413 of the sleeve member 41 such that an end of the optical connector 3 (the stationary portion 321 of the stop ring 32) is fixed to the sleeve member 41. In one or more embodiments, when the stationary portion 321 of the stop ring 32 is screwed, the tensile members 23 extending from the optical fiber cord 2 (see FIG. 5) are sandwiched between the stationary portion 321 and the sleeve member 41. A method of fixing the rear end of the housing 5 to the sleeve member 41 is not limited to the screwing. For example, the rear end of the housing 5 may be fixed to the sleeve member 41 by an adhesive material.

As shown in FIG. 6, the protective tube 42 of the boot unit 4 for an optical connector includes a tube body 421 extending in an axial direction with a uniform outside diameter, a front end portion (first end portion or first end) 422 extending frontward from the tube body 421, and a rear end portion (second end portion or second end) 423 extending rearward from the tube body 421 at an opposite side of the front end portion 422. The aforementioned optical fiber cord 2 is inserted into an interior of the protective tube 42. For example, this protective tube 42 is formed of a resin such as polyethylene. The protective tube 42 has such flexibility as to protect the optical fiber cord 2 that has been inserted into the interior of the protective tube 42. Specifically, when the optical fiber cord 2 is inserted into the protective tube 42, abrupt bending or winding of the optical fiber cord 2 is suppressed near the rear end portion of the boot member 43. Thus, generation of a bend loss is suppressed in the coated optical fiber 22 within the optical fiber cord 2.

Figure 7:
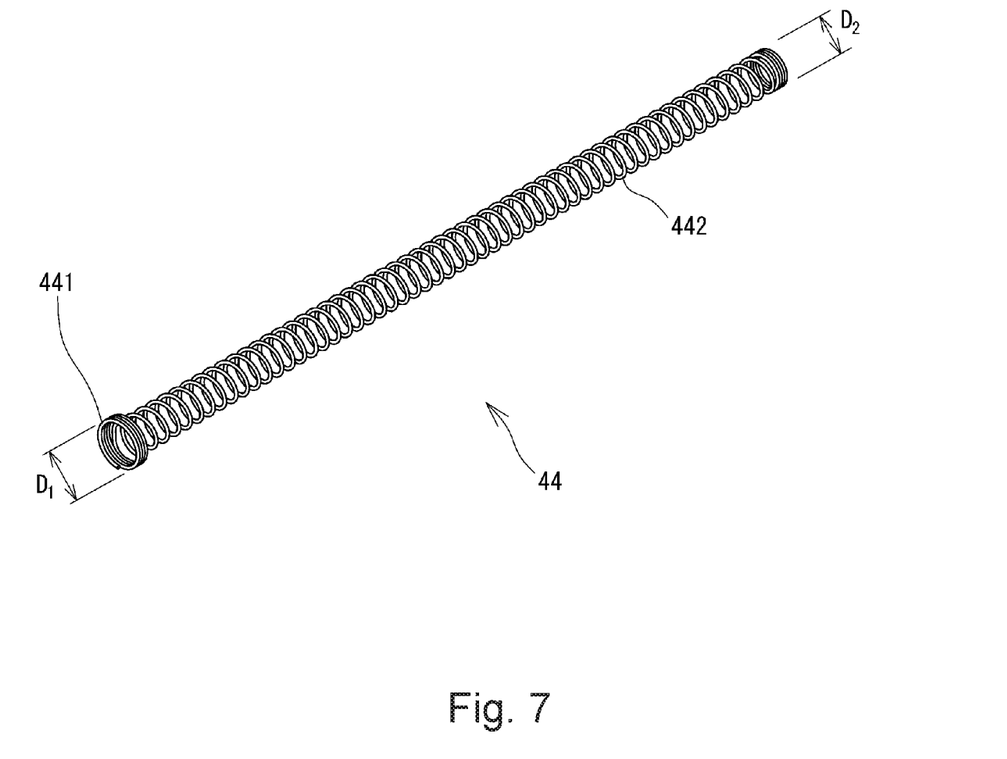
FIG. 7 is a perspective view showing a coil spring in the boot unit for an optical connector illustrated in FIG. 6.

FIG. 7 is a perspective view showing the coil spring 44 in the boot unit 4 for an optical connector according to one or more embodiments. As shown in FIG. 7, the coil spring 44 includes a larger-diameter portion 441 located at a front end and a smaller-diameter portion 442 extending rearward from the larger-diameter portion 441 in a spiral manner. The outside diameter of the larger-diameter portion 441 is defined as $D_1$, and the outside diameter of the smaller-diameter portion 442 is defined as $D_2$.

Figure 8:
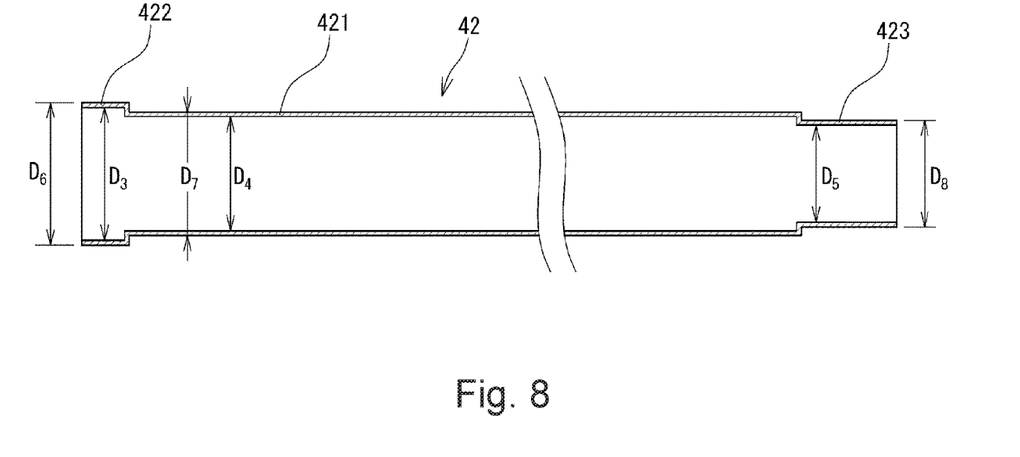
FIG. 8 is a cross-sectional view schematically showing a protective tube in the boot unit for an optical connector illustrated in FIG. 6.

FIG. 8 is a cross-sectional view schematically showing the protective tube 42 according to one or more embodiments. As shown in FIG. 8, the inside diameter $D_3$ of the front end portion 422 of the protective tube 42 is greater than the inside diameter $D_4$ of the tube body 421. The inside diameter $D_5$ of the rear end portion 423 of the protective tube 42 is smaller than the inside diameter $D_4$ of the tube body 421. The front end portion 422, the tube body 421, and the rear end portion 423 of the protective tube 42 are formed integrally as a single member. The front end portion 422, the tube body 421, and the rear end portion 423 have a generally uniform thickness. Therefore, the outside diameter $D_7$ of the tube body 421 is smaller than the outside diameter $D_6$ of the front end portion 422, and the outside diameter $D_8$ of the rear end portion 423 is smaller than the outside diameter $D_7$ of the tube body 421.

As shown in FIG. 4, the larger-diameter portion 441 of the coil spring 44 is located inside of the front end portion 422 of the protective tube 42. The outside diameter $D_1$ of the larger-diameter portion 441 is generally the same as the inside diameter $D_3$ of the front end portion 422. In other words, the front end portion 422 of the protective tube 42 is in intimate contact with the larger-diameter portion 441 of the coil spring 44. Furthermore, the smaller-diameter portion 442 of the coil spring 44 is located inside of the tube body 421 of the protective tube 42. The outside diameter $D_2$ of the smaller-diameter portion 442 is generally the same as the inside diameter $D_4$ of the tube body 421. In other words, the tube body 421 of the protective tube 42 is in intimate contact with the smaller-diameter portion 442 of the coil spring 44.

This protective tube 42 can readily be produced as follows: For example, the coil spring 44 is covered with a heat-shrinkable tube having an inside diameter greater than the outside diameter $D_1$ of the larger-diameter portion 441 of the coil spring 44. Then the heat-shrinkable tube is shrunk by heat. Alternatively, the tube body 421, the front end portion 422, and the rear end portion 423 may integrally be formed so as to have the same thickness, so that a protective tube 42 formed has such a shape.

Figure 9:
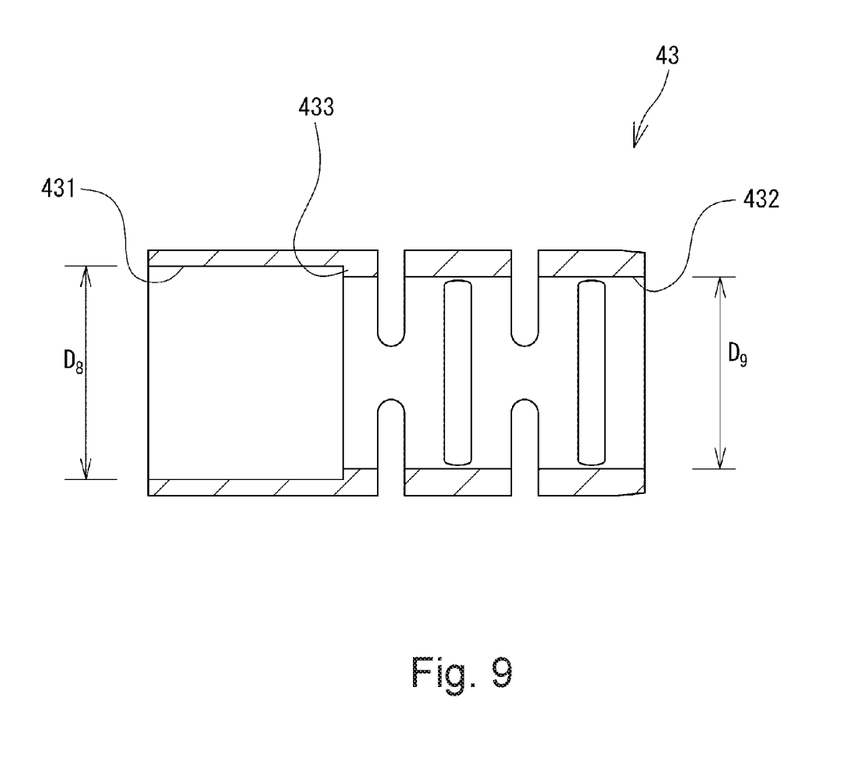
FIG. 9 is a cross-sectional view showing a boot member in the boot unit for an optical connector illustrated in FIG. 6.

FIG. 9 is a cross-sectional view showing the boot member 43 according to one or more embodiments. As shown in FIGS. 4 and 9, the boot member 43 is formed by a tubular member having a front opening portion 431 and a rear opening portion 432. This boot member 43 is formed of a material having flexibility such as rubber. The boot member 43 is attached to a rear end of the housing 5 of the optical connector 3. The boot member 43 reduces a bending stress applied to the optical fiber cord 2.

As shown in FIG. 9, the diameter $D_9$ of the front opening portion 431 of the boot member 43 is greater than the diameter $D_{10}$ of the rear opening portion 432. Thus, a step 433 is produced between the front opening portion 431 and the rear opening portion 432. Furthermore, the diameter $D_9$ of the front opening portion 431 is greater than the outside diameter $D_6$ of the front end portion 422 of the protective tube 42 (see FIG. 8). The diameter $D_{10}$ of the rear opening portion 432 is smaller than the outside diameter $D_6$ of the front end portion 422 of the protective tube 42 (see FIG. 8) and greater than the outside diameter $D_7$ of the tube body 421 (see FIG. 8).

Figure 10:
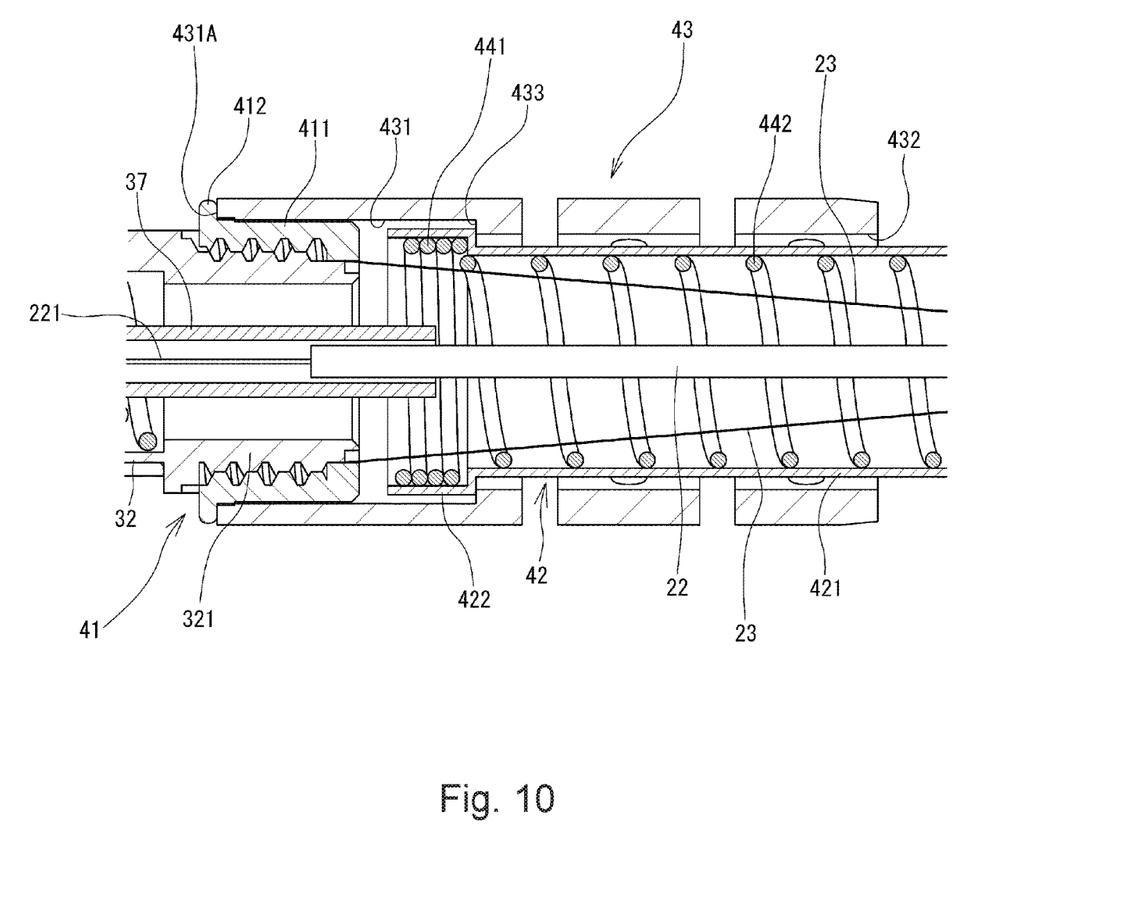
FIG. 10 is an enlarged cross-sectional view showing a joint portion of the boot unit for an optical connector illustrated in FIG. 4 and an optical unit.

FIG. 10 is an enlarged cross-sectional view showing a joint portion of the boot unit 4 for an optical connector and the optical connector 3 according to one or more embodiments. As shown in FIG. 10, the cylindrical portion 411 of the sleeve member 41 is fitted into the front opening portion 431 of the boot member 43. The flange portion 412 of the sleeve member 41 abuts a front end face 431A of the front opening portion 431 of the boot member 43. Thus, the abutment of the flange portion 412 against the front end face 431A of the front opening portion 431 allows the sleeve member 41 to be positioned with respect to the boot member 43. The sleeve member 41 may be fixed to the boot member 43 by using an adhesive material or the like.

As shown in FIG. 10, the protective tube 42, which has been attached to a portion of the optical fiber cord 2 where the coated optical fiber 22 is exposed, is inserted in the boot member 43. The front end portion 422 of the protective tube 42 is housed within the front opening portion 431 of the boot member 43. The tube body 421 of the protective tube 42 extends rearward through the rear opening portion 432 of the boot member 43.

As described above, the diameter $D_{10}$ of the rear opening portion 432 of the boot member 43 is smaller than the outside diameter $D_6$ of the front end portion 422 of the protective tube 42 and greater than the outside diameter $D_7$ of the tube body 421. Therefore, the front end portion 422 of the protective tube 42 engages with the step 433 of the boot member 43. With this configuration, the front end portion 422 of the protective tube 42 still engages with the step (engagement portion) 433 even if the protective tube 42 is pulled hard in a rear direction. Thus, the movement of the protective tube 42 in a longitudinal direction is regulated so as to prevent the protective tube 42 from coming out of the boot member 43.

Since the front end portion 422 of the protective tube 42 and the tube body 421 are formed as the same member in one or more embodiments, the front end portion 422 does not need to be produced separately from the tube body 421. Accordingly, the man-hour and cost required for the manufacturing process of a boot unit for an optical connector is prevented from increasing.

Furthermore, in one or more embodiments, the inside diameter $D_5$ of the rear end portion 423 of the protective tube 42 is smaller than the inside diameter $D_4$ of the tube body 421 as shown in FIG. 8. Therefore, the rear end portion 423 deforms depending upon the outside diameter of the optical fiber cord 2 if the outside diameter of the optical fiber cord 2 that has been inserted through the protective tube 42 is not less than $D_4$ and is not more than $D_5$. Thus, the rear end portion 423 is brought into intimate contact with the optical fiber cord 2. Accordingly, if the outside diameter of the optical fiber cord 2 is not less than $D_4$ and is not more than $D_5$, no gap is formed between the rear end portion of the protective tube 42 and the optical fiber cord 2 even when an optical fiber cord 2 having a different outside diameter is inserted through the protective tube 42. As a result, the optical fiber cord 2 is prevented from rattling near the rear end portion of the protective tube 42. In other words, no individual protective tube suitable for an optical fiber cord having a different outside diameter is needed in order to prevent the optical fiber cord 2 from rattling near an end portion of the protective tube 42.

In one or more embodiments, as shown in FIG. 10, the flange portion 412 of the sleeve member 41 abuts the front end face 431A of the front opening portion 431 of the boot member 43 to position the sleeve member 41 with regard to the boot member 43. Furthermore, the front end portion 422 of the protective tube 42 engages with the step (engagement portion) 433 of the boot member 43 so as to regulate the movement of the protective tube 42 in the longitudinal direction. Thus, a constant distance is maintained between a rear end face of the sleeve member 41 and a front end face of the protective tube 42 within the front opening portion 431. Accordingly, for example, the tensile members 23 housed in the optical fiber cord 2 are prevented from being clogged (stacked) inside of the front opening portion 431.

The terms "front," "rear," and other positional terms described herein are used in connection with the illustrated embodiments and may be varied depending on the relative positional relationship between components of the device.

Although embodiments of the present invention have been described, the present invention is not limited to the aforementioned embodiments. It should be understood that various different forms may be applied to the present invention within the technical idea thereof. For example, the aforementioned optical connector 3 is illustrated by way of example only. As a matter of course, the present invention is applicable to optical connectors having various shapes.

INDUSTRIAL APPLICABILITY

The present invention is suitably used for a connector-attached optical fiber cord in which an optical connecter is attached to an end of an optical fiber cord.

DESCRIPTION OF REFERENCE NUMERALS AND SIGNS

1 Connector-attached optical fiber cord
2 Optical fiber cord
3 Optical connector
4 Boot unit for optical connector
21 Sheath
22 Coated optical fiber
23 Tensile member
31 Plug frame
32 Stop ring
33 Coupling sleeve
34 Ferrule
35 Slider
36 Coil spring
37 Heat seal sleeve
41 Sleeve member
42 Protective tube
43 Boot member
44 Coil spring (spring member)
51 Fusion splice portion
221 Bare optical fiber
321 Stationary portion
322 Screw thread
341 Capillary portion
342 Flange portion
343 Short optical fiber
411 Cylindrical portion
412 Flange portion
413 Thread groove
421 Tube body
422 Front end portion (first end portion)
423 Rear end portion (second end portion)
431 Front opening portion
431A Front end face
432 Rear opening portion
433 Step (engagement portion)
441 Larger-diameter portion
442 Smaller-diameter portion
900 Protective tube
910 Tube body 920 Flange portion Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A connector-attached optical fiber cord comprising:
   an optical fiber cord comprising a coated optical fiber and a sheath surrounding a circumference of the coated optical fiber;
   a ferrule attached to a front end of the coated optical fiber;
   a housing that houses the ferrule and the optical fiber cord such that the ferrule is exposed to an exterior of the housing at a front end of the housing while the optical fiber cord extends out of a rear end of the housing;
   a protective tube attached to a portion of the optical fiber cord in which the coated optical fiber is exposed;
   a boot attached to the rear end of the housing and through which the portion of the optical fiber cord is inserted; and
   a spring disposed in the protective tube, wherein
   the protective tube comprises:
      a tube body having a uniform outside diameter; and
      a first end integrally formed with the tube body at an end of the tube body, the first end having an outside diameter greater than the uniform outside diameter of the tube body,
   the boot comprises an engagement portion that engages with the first end portion of the protective tube, and
   the spring comprises:
      a larger-diameter portion disposed inside of the first end of the protective tube and that has an outside diameter that corresponds to an inside diameter of the first end, and
      a smaller-diameter portion disposed inside of the tube body and that has a diameter less than that of the larger-diameter portion.

2. The connector-attached optical fiber cord as recited in claim 1, wherein the protective tube further comprises a second end located opposite to the first end, and the second end has an inside diameter less than an inside diameter of the tube body.

3. The connector-attached optical fiber cord as recited in claim 1, further comprising:
   a sleeve attached to the rear end of the housing, wherein
   the sleeve comprises a flange that abuts against a front end face of the boot.

4. The connector-attached optical fiber cord as recited in claim 2, further comprising:
   a sleeve attached to the rear end of the housing, wherein
   the sleeve comprises a flange that abuts against a front end face of the boot.

* * * * *